US011653587B2

(12) United States Patent  
Kraus (10) Patent No.: US 11,653,587 B2  
(45) Date of Patent: May 23, 2023

(54) SYSTEM AND METHOD FOR PRESENTING THE SURROUNDINGS OF AN AGRICULTURAL IMPLEMENT

(71) Applicant: Deere & Company, Moline, IL (US)

(72) Inventor: Timothy J. Kraus, Blakesburg, IA (US)

(73) Assignee: Deere & Company, Moline, IL (US)

( * ) Notice: Subject to any disclaimer, the term of this patent is extended or adjusted under 35 U.S.C. 154(b) by 275 days.

(21) Appl. No.: 17/023,677

(22) Filed: Sep. 17, 2020

(65) Prior Publication Data

US 2022/0078961 A1    Mar. 17, 2022

(51) Int. Cl.
*G06T 7/70* (2017.01)  
*A01B 69/00* (2006.01)  
(Continued)

(52) U.S. Cl.  
CPC .......... *A01B 69/004* (2013.01); *A01B 69/001* (2013.01); *G05D 1/0038* (2013.01);  
(Continued)

(58) Field of Classification Search  
CPC ....... A01B 69/004; A01B 69/001; G06T 7/70; G06T 5/50; G06T 2207/20221;  
(Continued)

(56) References Cited

U.S. PATENT DOCUMENTS 8,200,399 B2   6/2012 Madsen  
9,566,911 B2   2/2017 Greenwood et al.  
(Continued)

FOREIGN PATENT DOCUMENTS

DE   102019114667 A1   12/2020  
RU         2649916 C2    4/2018  
(Continued)

OTHER PUBLICATIONS

Extended European Search Report and Written Opinion issued in European Patent Application No. 21195868.1, dated Feb. 15, 2022, in 10 pages.

*Primary Examiner* — Jin Ge  
(74) *Attorney, Agent, or Firm* — Gary L. Montle; Lucian Wayne Beavers; Patterson Intellectual Property Law, PC (57) ABSTRACT

Systems and methods are disclosed herein for displaying images of certain surroundings of an agricultural implement, for example one including a frame extending between opposing distal ends of a length transverse to a working direction of the agricultural implement. Individual image regions of the surroundings of the agricultural implement are captured using cameras arranged on the agricultural implement and directed toward a working area in the working direction, wherein a corresponding display is generated on a user interface. One or more traveling conditions (e.g., an edge of the working area and/or an edge of the frame, respectively corresponding to a first end and/or second end of the frame) may be automatically projected in the working direction, wherein respective indicia corresponding to the projected traveling conditions are superimposed on the generated display. The indicia may optionally be modified dynamically based on determined changes in a projected course of the working direction.

18 Claims, 4 Drawing Sheets

(51) Int. Cl.
*G05D 1/00* (2006.01)
*G05D 1/02* (2020.01)
*G06T 5/50* (2006.01)

(52) U.S. Cl.
CPC ............ *G05D 1/0219* (2013.01); *G06T 5/50* (2013.01); *G06T 7/70* (2017.01); *G05D 2201/0201* (2013.01); *G06T 2207/20221* (2013.01); *G06T 2207/30244* (2013.01); *G06T 2207/30252* (2013.01)

(58) Field of Classification Search
CPC ........... G06T 2207/30244; G06T 2207/30252; G05D 1/0038; G05D 1/0219; G05D 2201/0201
USPC ............................................. 345/632; 701/50
See application file for complete search history.

(56) References Cited

U.S. PATENT DOCUMENTS

| | | |
|---|---|---|
| 9,928,659 B2 | 3/2018 | Dean et al. |
| 2002/0189220 A1 | 12/2002 | Beck |
| 2010/0194886 A1* | 8/2010 | Asari ................... G06T 7/85 348/148 |
| 2014/0088824 A1* | 3/2014 | Ishimoto ............ G06V 20/56 348/148 |
| 2014/0324272 A1* | 10/2014 | Madsen ............. A01B 69/001 701/28 |
| 2014/0324291 A1* | 10/2014 | Jones ................. G01C 21/165 701/41 |
| 2015/0217691 A1* | 8/2015 | Tanuki ................ H04N 7/181 348/148 |
| 2016/0041803 A1* | 2/2016 | Markov ................ G06F 3/147 701/48 |
| 2018/0170258 A1* | 6/2018 | Matsuzaki ............ A01B 76/00 |
| 2019/0059199 A1 | 2/2019 | Stanhope |
| 2020/0019778 A1 | 1/2020 | Frei et al. |
| 2021/0045283 A1 | 2/2021 | Faust et al. |
| 2021/0231453 A1* | 7/2021 | Colosky ............. A01C 21/005 |

FOREIGN PATENT DOCUMENTS

| | | |
|---|---|---|
| WO | WO2019063232 A1 | 4/2019 |
| WO | WO2020231934 A1 | 11/2020 |

\* cited by examiner

SYSTEM AND METHOD FOR PRESENTING THE SURROUNDINGS OF AN AGRICULTURAL IMPLEMENT

FIELD OF THE DISCLOSURE

The present disclosure relates generally to agricultural implements, and more particularly to systems and methods for assisting operators of such agricultural implements by displaying images corresponding to the surroundings in a working area of such agricultural implements.

BACKGROUND

Agricultural implements, including for example self-propelled or drawn (pull-type) implements, have been used for many years to till soil, plant crops, and harvest crop. For example, a land roller is a pull-type implement that is used to both level the soil and slightly compact the soil to create a good seed bed prior to planting a crop. Another type of "implement" is a mower conditioner, which is used to cut forage-type crops so they can be harvested and stored for animal feed. Exemplary self-propelled harvesting machinery such as windrowers, combines, forage harvesters, and others are used to harvest crops. Additionally, tractors are used to power/propel implements about the field. These machines are conventionally equipped with an engine, transmission, and hydraulic systems that powers/propels the machine across the field.

As farms continue to grow in size, so do the size of implements. In particular, implements are becoming progressively wider, as viewed laterally with respect to a working direction. It is common to see implements that are, e.g., forty feet or more in width.

One problem with implements of such width is that it is difficult for an operator to know the location of the outer edge of the implement and/or the edge of the working zone of the implement with any degree of certainty because of "parallax," and/or because the implement is frequently behind the operator. Because it is difficult to know precisely where the outer edge of the implement is located, it is likewise difficult to maneuver the implement along obstacles such as for example a fence line.

In addition, it is very difficult to guide the implement in a path adjacent to a previous path, particularly when the edge of the working zone is inside the outermost edge of the implement. To compensate, the operator normally overlaps the previous pass, which decreases the machine's effective working width and effectively reduces field capacity.

Manufacturers have developed "auto-guidance" systems that use global positioning system (GPS) technology and/or auto-steering systems in an effort to resolve this problem, but these systems are relatively expensive and often times do not help the operator maneuver around an object.

Therefore, it would be desirable to provide a simple and cost-effective system that can allow an operator to easily identify the outermost edge of an agricultural implement and a working zone of the implement.

BRIEF SUMMARY

The current disclosure provides an enhancement to conventional systems, at least in part by introducing a novel arrangement of cameras, display units, and associated software which can for example be used to allow the operator to not only see the surrounding area but further display a line or other information on the display unit to indicate where the outer edge of the implement is and where the edge of the working zone is. In addition, the display can also include additional indicator markings such as for example to denote the distance from the edge and/or from the edge of the working zone.

In one embodiment, a method is disclosed herein for displaying images of one or more surroundings of an agricultural implement, the agricultural implement including a frame extending between first and second opposing distal ends of a length transverse to a working direction of the agricultural implement. One or more individual image regions of the surroundings of the agricultural implement are captured using at least one camera arranged on the agricultural implement and directed toward a working area in the working direction. A display corresponding to the one or more individual image regions is generated on a user interface, and one or more traveling conditions are automatically projected in the working direction, wherein respective indicia corresponding to the one or more projected traveling conditions are superimposed on the generated display.

In one exemplary aspect of the above-referenced embodiment, the one or more automatically projected traveling conditions may comprise at least one edge of the working area, respectively corresponding to at least one of the first end and the second end of the frame.

In another exemplary aspect of the above-referenced embodiment, the respective indicia corresponding to the at least one edge of the working area may comprise at least one line superimposed on the generated display to correspond with a projected path of the at least one edge of the working area.

In another exemplary aspect of the above-referenced embodiment, the one or more automatically projected traveling conditions may comprise at least one edge of the frame, respectively corresponding to at least one of the first end and the second end of the frame.

In another exemplary aspect of the above-referenced embodiment, the respective indicia corresponding to the at least one edge of the working area and the at least one edge of the frame comprise lines may be superimposed on the generated display to correspond respectively with a projected path of the at least one edge of the working area and a projected path of the at least one edge of the frame.

In another exemplary aspect of the above-referenced embodiment, additional indicia may be superimposed on the generated display corresponding to incremental dimensions for the projected path of at least one edge of the working area and the projected path of at least one edge of the frame.

In another exemplary aspect of the above-referenced embodiment, a projected course of the working direction of the agricultural implement may be determined based on received steering commands, and the respective indicia superimposed on the generated display may be dynamically modified based on changes in the projected course of the working direction.

In another exemplary aspect of the above-referenced embodiment, user manipulation of at least one of the respective indicia superimposed on the generated display may be enabled, wherein output signals to a controller of the agricultural implement are dynamically generated based on the user manipulation.

In another exemplary aspect of the above-referenced embodiment, the captured one or more individual image regions of the surroundings of the agricultural implement may comprise a plurality of overlapping image regions captured using a respective plurality of cameras arranged on at least the frame of agricultural implement, wherein an overhead image may be generated on the user interface by joining together image details of the overlapping image regions.

In another exemplary aspect of the above-referenced embodiment, the method may include determining a change between a forward working direction and a rearward working direction of the agricultural implement, directing one or more of the cameras to change direction to an image region corresponding to the determined working direction of the agricultural implement, and generating at least a portion of the display on the user interface corresponding to the one or more image regions corresponding to the determined working direction of the agricultural implement, wherein one or more traveling conditions may be automatically projected in the determined working direction, and respective indicia corresponding to the one or more projected traveling conditions are superimposed on the generated at least a portion of the display.

In another embodiment, regarding a self-propelled work vehicle comprising or configured to draw an agricultural implement as disclosed herein, the implement comprises a frame extending between first and second opposing distal ends of a length transverse to a working direction of the agricultural implement, and is further provided with at least one camera arranged on the agricultural implement and directed toward a working area in the working direction, the at least one camera configured to capture one or more individual image regions of the surroundings of the agricultural implement. The self-propelled work vehicle is further provided with a controller which is configured to execute or otherwise direct the performance of steps in a method according to the aforementioned embodiment and any one or more of the exemplary aspects therefor.

In one exemplary aspect of the aforementioned embodiment, the at least one camera comprises a camera arranged on an operator cab of the agricultural implement.

In another exemplary aspect of the aforementioned embodiment, the at least one camera comprises a first camera arranged proximate the first end of the frame and a second camera arranged proximate the second end of the frame.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-5, various embodiments may now be described of a self-propelled work vehicle which comprises or otherwise configured to draw an agricultural implement, along with associated systems and methods of operation. Generally stated, the following embodiments may utilize one or more cameras and an onboard display unit to display the outermost edge of the implement and/or the outer edge of the "working zone" of the implements.

Figure 1:
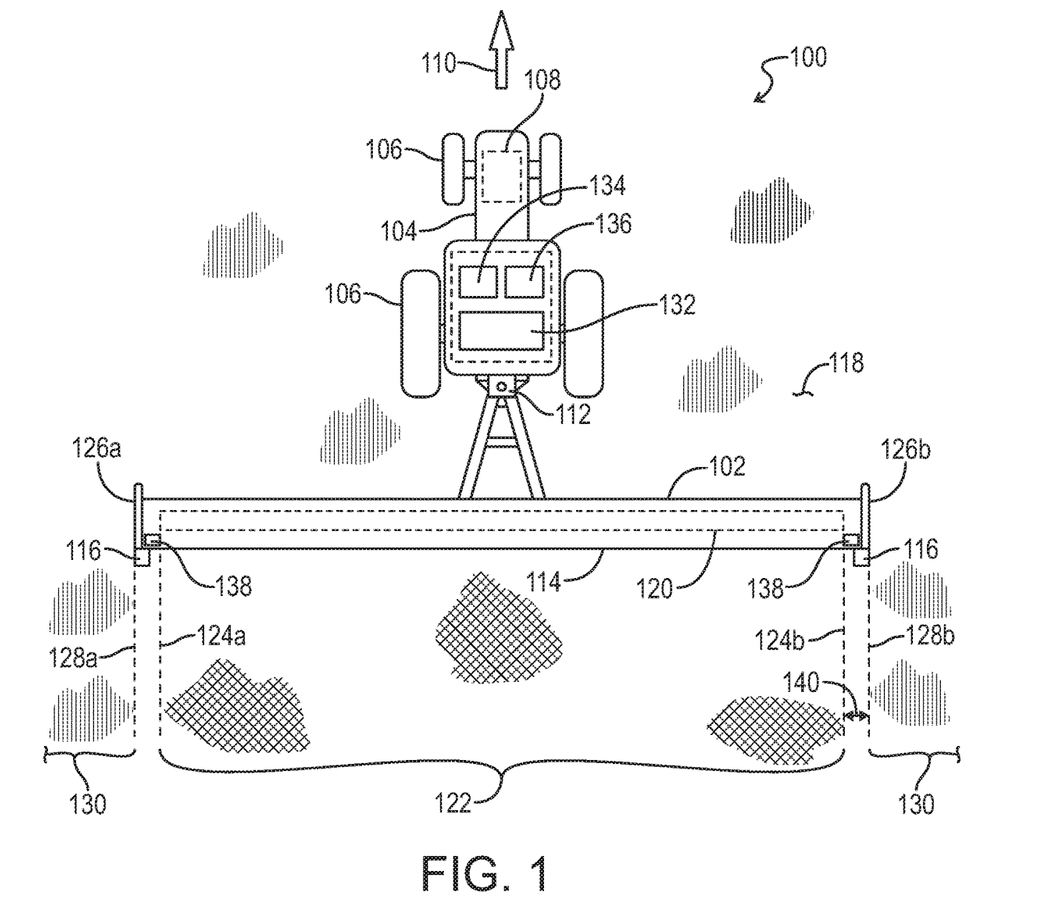
FIG. 1 is a first overhead view of a self-propelled work vehicle drawing an agricultural implement according to an embodiment as disclosed herein.

Referring now to FIG. 1, in a particular embodiment as disclosed herein a drawn implement 102 is schematically shown being towed by a tractor 100. It is understood that various alternative self-propelled work vehicles 100 are contemplated within the scope of the present disclosure, including for example vehicles having an integrated implement 102 which may be disposed in front of the vehicle in a working direction 110 as opposed to behind the vehicle in the working direction as illustrated.

The tractor 100 includes a tractor frame 104 carried on a plurality of wheels or other ground engaging units 106. An engine 108 drives the ground engaging units 106 to move the tractor in at least the forward direction 110. The forward direction 110 may also be referred to as the heading of the tractor 100. The engine 108 may also provide power to a power take off (not shown) located at a rear of the tractor 100. A draw bar or other hitch 112 is located at the rear of the tractor 100.

The drawn implement 102 may generally be described as including a main frame 114 with a length extending laterally with respect to the working direction 110, and a plurality of ground engaging units 116 for supporting the main frame 114 from the ground surface 118. In the example shown, only two ground engaging units 116 are illustrated on opposing ends of the frame, but it may be understood that an additional one or more ground engaging units may and frequently will be disposed along the length of the frame. The drawn implement 102 further includes a working unit 120 supported from the main frame and configured to engage crops as the implement 102 moves in the forward direction 110 across the ground surface. The implement 102 further includes a draft tongue extending from the main frame 114 for attachment to the tractor 100.

Depending upon the type of drawn implement 102, and/or the type of work being performed by the implement, the working unit 120 may be of different types. For example, for a mower conditioner the working unit may be a cutting head. For a side-drawn baler, the working unit may include a hay pick up device. An invention as disclosed herein is by no means limited to implements of these types, but can also be used in other towed implements, e.g., soil conditioning tools, saws, sprayers and the like, and accordingly the working unit 120 is only generally illustrated and further description regarding its implementation is not required for a complete understanding of the invention to one of skill in the art.

As illustrated in FIG. 1, the outer dimensions of the working unit 120 generally correspond with the outer edges 124a, 124b of a working area 122 for the implement 102. Surface areas including crop material 130 outside of the working area 122 are as-yet uncut by the working unit, unless of course they have previously been traversed and cut, as represented in the right portion of FIG. 2 and further discussed below. The outer dimensions 126 of the main frame 114 of the implement 102 (i.e., at the laterally opposing ends of the frame in the working direction 110) generally correspond with the outer edges 128a, 128b, which are offset from the outer edges 124a, 124b of the working area 122 by a distance 140. Accordingly, as further described in more detail below, an operator frequently needs to account for such a distance 140 when navigating the implement 102 with respect to obstacles.

A camera 138 is provided on one or more locations along the main frame 114, and may for example be mounted on a dedicated camera mount. The camera 138 may more generally be referred to as an image sensor 138, for example in the form of a charge coupled device (CCD) or complementary metal oxide semiconductor (CMOS) image sensor, and the camera mount may be referred to as a sensor mount. In some embodiments, additional sensors may be provided of other types, in addition to a camera; for example ultrasonic sensors, infrared sensors, laser sensors, and others may be used to detect the crops ahead of the drawn implement 102, as a replacement for or in addition to images captured by a corresponding camera. It will also be understood that more than one sensor may be used in association with a single implement, or that multiple cameras and/or sensors may be provided for a single location along the implement, such as for example to capture images in different directions. While cameras 138 are shown in FIG. 1 on opposing ends of the main frame 114, any one or more cameras according to an invention as disclosed herein may be implemented at alternative locations along the main frame, depending on the context of usage or other practical considerations.

In an embodiment, the camera mount for a given camera 138 may be pivotable about at least one primarily vertical first axis. This allows the orientation of a field of view of the camera 138 to be selectively adjusted about the first axis so that the field of view can be oriented in a desired, e.g. primarily forward facing, direction. Orientation of the field of view may be defined as the orientation of a central axis of the field of view. For example, the central axis of the field of view may be oriented such that the field of view encompasses or is centered on one or both of the edges 124a or 124b of the working area 122 so that the working unit 120 can be best oriented relative to the edge 124a or 124b. This orientation may change dependent upon a change in the heading 110 of the tractor 100.

As used herein if an axis is described as "primarily" vertical, this means that the axis is closer to vertical than to horizontal, i.e. the axis is within a range of plus or minus 45 degrees from vertical. If an axis is described as "primarily" horizontal, this means that the axis is closer to horizontal than it is to vertical, i.e. the axis is within a range of plus or minus 45 degrees from horizontal. Similarly, if a direction or orientation is described as "primarily" forward, the direction is within a range of plus or minus 45 degrees from the forward direction 110. Thus when the field of view is described as being oriented in a primarily forward facing direction, this means that a horizontal component of the central axis lies within plus or minus 45 degrees of the forward direction 110 when the forward direction is horizontal.

The field of view may be oriented such that the horizontal component of the central axis is plus or minus thirty degrees from the forward direction 110 when the forward direction is horizontal, and more preferably the field of view may be oriented such that the horizontal component of the central axis is plus or minus ten degrees from the forward direction when the forward direction is horizontal.

Figure 4:
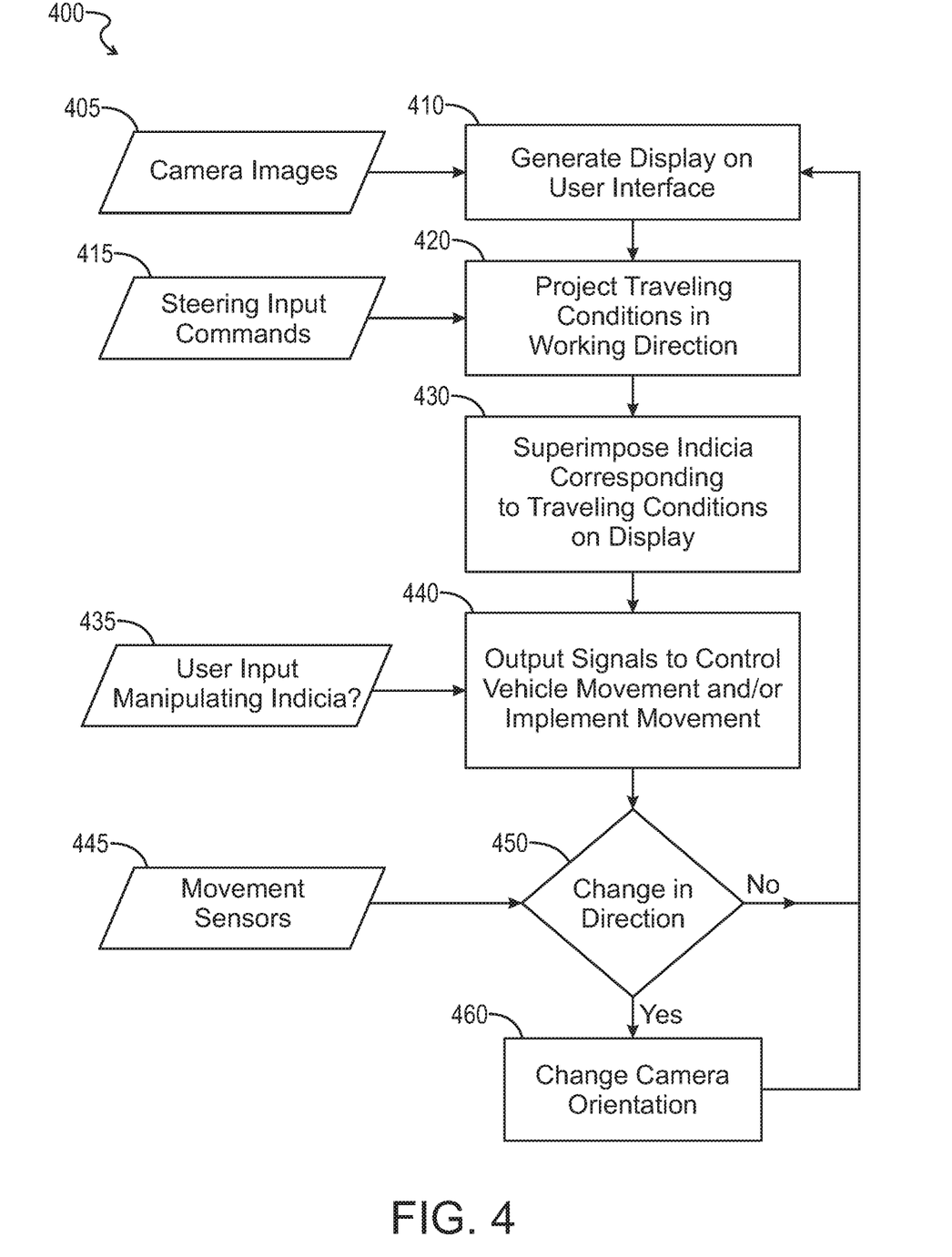
FIG. 4 is a flowchart representing an exemplary method as disclosed herein.

Still referring to FIG. 1, the cameras 138 and/or alternative sensor assemblies are functionally linked to a controller 132 associated with the work vehicle 100. The output signals from the cameras may be provided directly to the controller or for example via intervening components for analog-to-digital conversion and/or video interface (not shown). The controller 132 may typically be located in an operator cab of the work vehicle but may in certain embodiments be located on the implement 102 itself. The controller 132 may generally be configured to automatically and/or user-selectively perform operations as more particularly described below with respect to method 400. Various operations, steps or algorithms as described in connection with the controller can be embodied directly in hardware, in a computer program product such as a software module executed by a processor, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The controller 132 is further functionally linked to a user interface 134 including a display unit 134 for selectively displaying information to the operator and an input device 136 for receiving inputs from the operator. The display unit and the input device may be collectively provided as a module with respect to a user interface 134, including for example a touchscreen to enable user manipulation and/or inputs corresponding to displayed elements. The controller 132 and user interface 134 may be discrete components, or may still further collectively be provided as parts of the same vehicle control unit. The controller 132 may further be functionally linked (via the user interface 134 or otherwise via discrete data connections) to receive inputs with respect to various controls or user inputs (e.g., a steering wheel, joysticks, levers, buttons) for operating the work vehicle 100 and/or the associated implement 102. Such an onboard interface may be coupled to a control system via for example a CAN bus arrangement or other equivalent forms of electrical and/or electro-mechanical signal transmission. Another form of user interface (not shown) may take the form of a display that is generated on a remote (i.e., not onboard) computing device, which may display outputs such as status indications and/or otherwise enable user interaction such as the providing of inputs to the system. In the context of a remote user interface, data transmission between, for example, a vehicle control system and the user interface may take the form of a wireless communications system and one or more associated components as are conventionally known in the art.

The display portion of the user interface 134 may be configured to receive output signals from the controller 132 and further display or otherwise implement such signals in the form of audio, visual, or audio-visual indicia for user review, manipulation, analysis, alerting, and the like.

Figure 2:
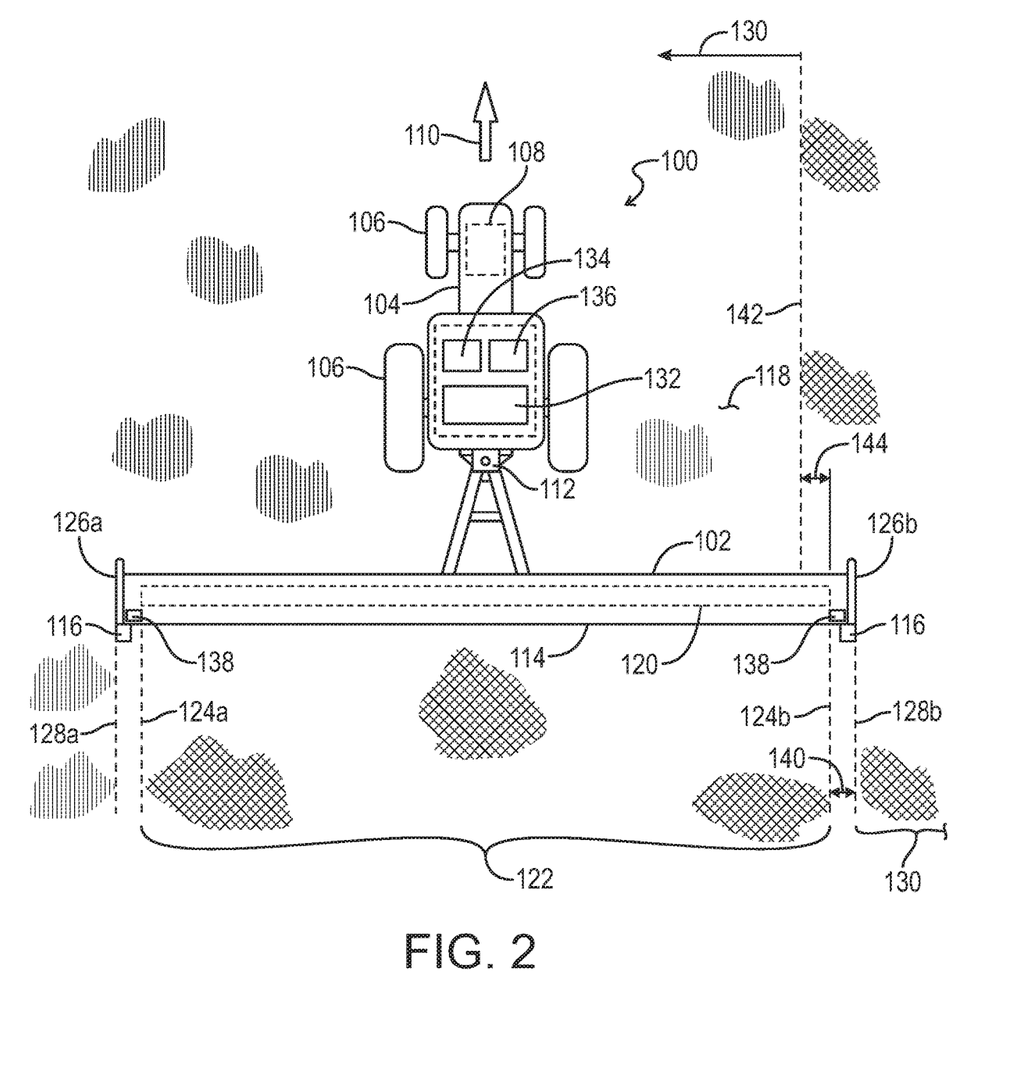
FIG. 2 is a second overhead view of the self-propelled work vehicle as represented in FIG. 1.

Referring additionally now to FIG. 2, it may be noted that due at least in part to the logistics of the implement 102, for example the length of the main frame 114 and corresponding parallax or the positioning of the frame behind the operator in the moving direction, the operator typically needs to "overlap" the previous cut crop because they cannot precisely determine the edges 124a, 124b of the working area 122 of the working unit 120. Rather than potentially have an uncut area by inadvertently navigating one of the edges 124a, 124b to the inside of the desired working area, the operator thus more conservatively produces an overlap distance 144 which is the difference between the one of the edges 124a, 124b and a previous cut crop edge 142 on the corresponding side.

Figure 3:
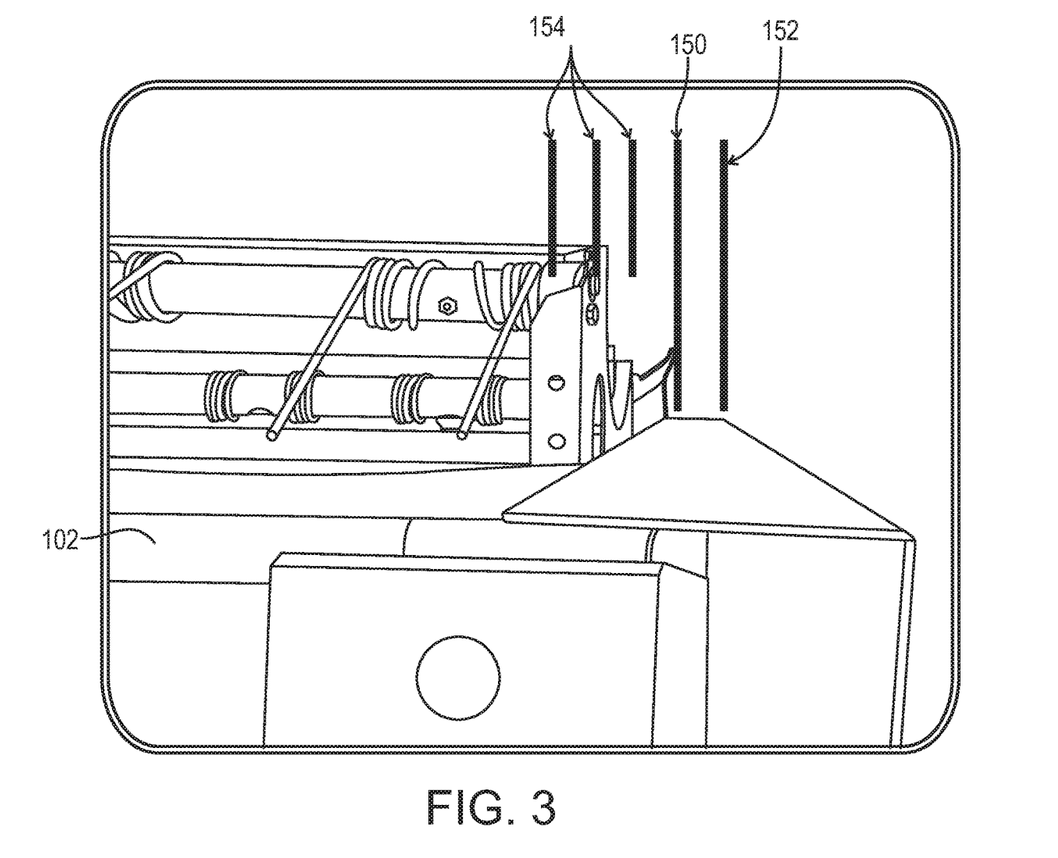
FIG. 3 is a perspective view representing an exemplary display generated according to an embodiment as disclosed herein.

Referring next to FIG. 3, embodiments of a system as disclosed herein may enable operators to reduce the aforementioned overlap distance 144 by displaying images corresponding to a field of vision for an appropriately positioned camera 138 with respect to at least the one of the edges 124a, 124b. The displayed image may be supplemented with indicia 150, 152, 154 that are generated by the controller 132 and superimposed atop the displayed image for the operator's benefit. For example, a first indicia 150 may be a line that is projected outward and forward in the working direction 110 with respect to the displayed image, corresponding to a projected edge 124b of the working area 122 of the working unit 120. A second indicia 152 may be a line that is projected outward and forward in the working direction 110 with respect to the displayed image, corresponding to a projected edge 128b of the main frame 114 of the implement 102. Additional indicia 154 may optionally be provided as dimensional markings to visually indicate dimensions, e.g., of the distance 140 between the projected outer edge 150 of the working area and the projected outer edge 152 of the main frame. The additional indicia 154 are visually represented to the left of the initial indicia 150, 152, but the scope of the present disclosure likewise contemplates locating the dimensional markings 154 or other additional indicia 154 to the right or other positions with respect to the initial indicia 150, 152.

The operator may further visually be able to determine a distance 144 between the projected edge 150 of the working area and the previous cut crop line. In certain embodiments, wherein for example additional sensors are provided to detect cut crop in front of the implement 102 in the working direction 110, or wherein the controller 132 is configured with data processing algorithms for identifying crop type and/or configurations in front of the implement in the working direction, additional indicia (not shown) may likewise be generated to indicate the crop information and associated distances or other relevant information.

Referring next to FIG. 4, a method 400 of operation may now be described, for illustrative purposes relating to the embodiments of the self-propelled work vehicle 100 as described above.

Various images 405 may be captured by one or more cameras 138 located in association with the work vehicle 100 and/or implement 102. While the cameras may preferably be located near the outer edges 128a, 128b of the implement, the present disclosure contemplates that one or more cameras may alternatively or additionally be located anywhere on the implement 102 or on the vehicle 100 such as for example the operator cab.

At least one of the cameras 138 may have a field of vision encompasses at least an area near an associated outer edge 128a, 128b of the implement 102, wherein the controller 132 processes the images received from the camera and actively displays (step 410) the view to the operator via a display unit 134. In various embodiments, the display may be provided via a small display in any or all of an operator panel of the cab, a heads-up display in the windshield, a modular computing device, or the like.

In one embodiment, the displayed images may correspond directly to fields of vision for the respective cameras, at the corresponding orientations, wherein additional indicia may be superimposed by the controller 132 over the raw images as further described below. In an alternative embodiment, the images generated on the display unit may be fully rendered by the controller 132 but representative of the raw images, wherein the "superimposed" indicia are merely part of the rendered image in a style more closely resembling artificial reality.

In another embodiment, the displayed images may be provided from alternative perspectives. The different perspectives may in some cases be user selectable. As one example, rather than generate a plurality of images from the perspectives of each respective camera, a single "overhead" view may be stitched from images obtained from the several cameras 138 and shown in the display unit 134. For example, a first camera may be mounted on a left side of the implement 102 and arranged to capture a first viewing area, a second camera may be mounted on the work vehicle 100 and arranged to capture a second viewing area, and a third camera may be mounted on a right side of the implement and arranged to capture a third viewing area, along with any other cameras and corresponding viewing areas that may be desired. The position and size of the viewing area recorded by a respective camera may typically depend on the arrangement and orientation of the camera on the work vehicle or main frame of the implement, and further on the camera lens system, in particular the focal length of the lens of the camera. In an embodiment, each camera may be mounted at a specific setting angle in relation to the plane of the associated work vehicle or main frame of the implement, so that the viewing direction of the camera is inclined downwardly in a sloping manner to the ground surface. Whereas each camera would record a substantially rectangular image detail of the ground surface if the viewing direction of the camera was orthogonal to the ground surface, in accordance with the above-referenced setting angles a trapezoidal image region of the ground surface is recorded by each camera. The course of the overhead view stitching may depend on the position and size of the overlapping trapezoidal image details.

The controller 132 further projects (step 420) traveling conditions for the vehicle 100 and the implement 102 in the working direction 110. Such projections may be facilitated by processing steering input commands 415 received by the controller 132 via a machine control unit or directly via user interface tools. The controller 132 further superimposes indicia corresponding to the projected traveling conditions on the generated display (step 430). For example, the controller 132 may determine from the received steering commands that the vehicle 100 will be turning to the left, and accordingly generate indicia superimposed on the display to reflect the change in movement. Lines on the display may be curved in nature to correspond with, e.g., the projected outer edge 152 of the main frame as the vehicle turns. If the controller 132 is capable of discerning a newly selected path (or a predetermined path) of the vehicle, rather than merely react instantaneously to steering commands, the superimposed indicia may accordingly be generated to reflect travel of the vehicle along the path, wherein the lines are preferably not curved to the horizon but instead correlate directly to the projected outer edge 152 of the main frame as the vehicle (and implement) travels along the path.

In certain embodiments, the user interface 134 may enable selective user manipulation 435 of the indicia 150, 152, 154, or other generated display elements to generate signals 440 which initiate control features of the vehicle 100 for reducing the distance 144 between the projected working area 150 and a previous cut crop line, and/or to avoid engaging of an obstacle in the field of vision by the projected outer edge 152 of the main frame. For example, the user interface 134 may enable operator selection of one of the projected lines 150, 152, along with further selection of an obstacle (not shown) in conjunction with a selected control mode. In such a control mode, the vehicle 100 may be configured to automatically undertake an obstacle avoidance process, or the controller 132 may be configured to generate visual or audio-visual information to the operator regarding the proximity of said obstacle with respect to the projected outer edge 152, thereby facilitating manual steering of the vehicle 100 and the associated implement 102 for obstacle avoidance.

In certain embodiments, the controller 132 may further receive signals 445 from movement sensors or for example from a vehicle control unit to further determine whether or not the vehicle 100 is travelling in a direction other than the forward working direction 110. If a change in determined is determined (i.e., "yes" in response to the query in step 450), the controller 132 may direct adjustments by one or more camera mounts to change the orientation of the respective cameras, corresponding to the changed direction/orientation of the vehicle 100 and/or implement 102. For example, it is possible to have the camera/display system automatically provide the operator with a "rearward view" including at least one of the aforementioned superimposed indicia/line markings when the operator is backing up the implement 102. As previously noted, this rearward view may be provided via a camera system that provides multi-directional views by controlling the camera mounts, or alternatively the system could selectively alternate views between multiple cameras arranged in each of a plurality of orientations to capture desired fields of view.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B. and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of displaying images of one or more surroundings of an agricultural implement propelled or drawn by a work vehicle integrated with or coupled thereto, the agricultural implement including a frame extending between first and second opposing distal ends of a first length transverse to a working direction of the agricultural implement, the work vehicle including a frame extending between first and second opposing distal ends of a second length transverse to the working direction of the agricultural implement and less than the first length, the method comprising:

capturing one or more individual image regions of the surroundings of the agricultural implement using at least one of a first camera and a second camera arranged on the agricultural implement and directed toward a working area in the working direction, wherein the first camera is arranged proximate the first end of the frame of the agricultural implement and outside of the second length transverse to the working direction, and the second camera is arranged proximate the second end of the frame of the agricultural implement and outside of the second length transverse to the working direction;

ascertaining one or more previous cut crop lines and/or areas proximate the working area in the working direction of the agricultural implement;

generating a display corresponding to the one or more individual image regions on a user interface; and automatically projecting one or more traveling conditions in the working direction, wherein respective indicia corresponding to the one or more projected traveling conditions are superimposed on the generated display, wherein the one or more automatically projected traveling conditions comprises at least one edge of the working area, respectively corresponding to at least one of the first end and the second end of the frame of the agricultural implement, and at least one previous cut crop line respectively corresponding to the at least one edge of the working area.

2. The method of claim 1, wherein the one or more automatically projected traveling conditions comprises at least one edge of the working area, respectively corresponding to at least one of the first end and the second end of the frame of the agricultural implement.

3. The method of claim 2, wherein the respective indicia corresponding to the at least one edge of the working area comprise at least one line superimposed on the generated display to correspond with a projected path of the at least one edge of the working area.

4. The method of claim 2, wherein the one or more automatically projected traveling conditions comprises at least one edge of the frame of the agricultural implement, respectively corresponding to at least one of the first end and the second end of the frame of the agricultural implement.

5. The method of claim 4, wherein the respective indicia corresponding to the at least one edge of the working area and the at least one edge of the frame of the agricultural implement comprise lines superimposed on the generated display to correspond respectively with a projected path of the at least one edge of the working area and a projected path of the at least one edge of the frame of the agricultural implement.

6. The method of claim 5, wherein additional indicia are superimposed on the generated display corresponding to incremental dimensions for the projected path of at least one edge of the working area and the projected path of at least one edge of the frame of the agricultural implement.

7. The method of claim 5, further comprising:

determining a projected course of the working direction of the agricultural implement based on received steering commands; and dynamically modifying the respective indicia superimposed on the generated display based on changes in the projected course of the working direction.

8. The method of claim 5, further comprising:

enabling user manipulation of at least one of the respective indicia superimposed on the generated display; and dynamically generating output signals to a controller of the agricultural implement based on the user manipulation.

9. The method of claim 1, wherein the captured one or more individual image regions of the surroundings of the agricultural implement comprise a plurality of overlapping image regions captured using the first camera, the second camera, and one or more further cameras arranged on at least the frame of the agricultural implement, the method further comprising:
generating an overhead image on the user interface by joining together image details of the overlapping image regions.

10. The method of claim 1, further comprising:
determining a change between a forward working direction and a rearward working direction of the agricultural implement;
directing one or more of the cameras to change direction to an image region corresponding to the determined working direction of the agricultural implement;
generating at least a portion of the display on the user interface corresponding to the one or more image regions corresponding to the determined working direction of the agricultural implement; and
automatically projecting one or more traveling conditions in the determined working direction, wherein respective indicia corresponding to the one or more projected traveling conditions are superimposed on the generated at least a portion of the display.

11. A self-propelled work vehicle comprising or configured to propel or draw an agricultural implement, the self-propelled work vehicle comprising:
a frame of the agricultural implement extending between first and second opposing distal ends of a first length transverse to a working direction of the agricultural implement;
a frame of the work vehicle extending between first and second opposing distal ends of a second length transverse to the working direction of the agricultural implement and less than the first length;
a first camera and a second camera arranged on the agricultural implement and directed toward a working area in the working direction, the first and second camera configured to capture one or more individual image regions of the surroundings of the agricultural implement, wherein the first camera is arranged proximate the first end of the frame of the agricultural implement and outside of the second length transverse to the working direction, and the second camera is arranged proximate the second end of the frame of the agricultural implement and outside of the second length transverse to the working direction; and
a controller configured to:
ascertain one or more previous cut crop lines and/or areas proximate the working area in the working direction of the agricultural implement,
receive at least one of the captured one or more individual image regions,
generate a display corresponding to the at least one of the one or more individual image regions on a user interface, and
automatically project one or more traveling conditions in the working direction, wherein respective indicia corresponding to the one or more projected traveling conditions are superimposed on the generated display,
wherein the one or more automatically projected traveling conditions comprises at least one edge of the working area, respectively corresponding to at least one of the first end and the second end of the frame of the agricultural implement, and at least one previous cut crop line respectively corresponding to the at least one edge of the working area.

12. The self-propelled work vehicle of claim 11, wherein the one or more automatically projected traveling conditions comprises:
at least one edge of the working area, respectively corresponding to at least one of the first end and the second end of the frame of the agricultural implement; and
at least one edge of the frame of the agricultural implement, respectively corresponding to at least one of the first end and the second end of the frame of the agricultural implement.

13. The self-propelled work vehicle of claim 12, wherein the respective indicia corresponding to the at least one edge of the working area and the at least one edge of the frame of the agricultural implement comprise lines superimposed on the generated display to correspond respectively with a projected path of the at least one edge of the working area and a projected path of the at least one edge of the frame of the agricultural implement.

14. The self-propelled work vehicle of claim 13, wherein the controller is configured to superimpose additional indicia on the generated display corresponding to incremental dimensions for the projected path of at least one edge of the working area and the projected path of at least one edge of the frame of the agricultural implement.

15. The self-propelled work vehicle of claim 11, wherein the controller is further configured to:
determine a projected course of the working direction of the agricultural implement based on received steering commands; and
dynamically modify the respective indicia superimposed on the generated display based on changes in the projected course of the working direction.

16. The self-propelled work vehicle of claim 11, wherein the controller is further configured to:
determine user manipulation of at least one of the respective indicia superimposed on the generated display; and
regulate one or more of a steering direction, a forward movement, and a rearward movement of the agricultural implement based on the user manipulation.

17. The self-propelled work vehicle of claim 11, wherein:
the captured one or more individual image regions of the surroundings of the agricultural implement comprise a plurality of overlapping image regions captured using the first camera, the second camera, and one or more further cameras arranged on at least the frame of the agricultural implement, and
the controller is further configured to generate an overhead image on the user interface by joining together image details of the overlapping image regions.

18. The self-propelled work vehicle of claim 11, wherein the controller is further configured to:
determine a change between a forward working direction and a rearward working direction of the agricultural implement;
direct one or more of the cameras to change direction to an image region corresponding to the determined working direction of the agricultural implement;
generate at least a portion of the display on the user interface corresponding to the one or more image regions corresponding to the determined working direction of the agricultural implement; and automatically project one or more traveling conditions in the determined working direction, wherein respective indicia corresponding to the one or more projected traveling conditions are superimposed on the generated at least a portion of the display.

* * * * *